United States Patent [19]

Borovicka, Sr.

[11] Patent Number: 4,608,410

[45] Date of Patent: * Aug. 26, 1986

[54] THERMOSET ACRYLIC LATICES FOR WOOD COATING

[75] Inventor: David A. Borovicka, Sr., Parma, Ohio

[73] Assignee: SCM Corporation, New York, N.Y.

[*] Notice: The portion of the term of this patent subsequent to Jun. 25, 2002 has been disclaimed.

[21] Appl. No.: 648,077

[22] Filed: Sep. 7, 1984

[51] Int. Cl.$^4$ .................. C08L 61/24; C08L 33/26; C09D 3/52

[52] U.S. Cl. .................. 524/512; 524/555; 428/479.6

[58] Field of Search .................. 524/512, 555; 428/479.6

[56] References Cited

U.S. PATENT DOCUMENTS

| | | | |
|---|---|---|---|
| 3,218,280 | 11/1965 | Koral | 524/512 |
| 3,635,867 | 1/1972 | Yuille | 524/512 |
| 3,959,202 | 5/1976 | Blank | 524/512 |
| 4,442,257 | 4/1984 | Borovicka | 524/555 |
| 4,444,941 | 4/1984 | Borovicka | 525/375 |
| 4,525,535 | 6/1985 | Craun | 524/512 |
| 4,540,735 | 9/1985 | Borovicka | 524/512 |

FOREIGN PATENT DOCUMENTS 1509791  5/1978  United Kingdom ............... 524/512

*Primary Examiner*—C. Warren Ivy
*Attorney, Agent, or Firm*—A. Joseph Gibbons; Thomas M. Schmitz

[57] ABSTRACT

Thermosetting low temperature cure latex coating compositions are prepared by emulsion polymerization in aqueous medium from non-hydroxyl bearing acrylic monomers, acrylamide or methacrylamide and a major proportion of a vinyl unsaturated hydrocarbon. When hot or cold blended with a glycoluril cross-linker and applied to a wood substrate, the coating exhibits excellent gloss properties and MEK resistance.

3 Claims, No Drawings

:::page
THERMOSET ACRYLIC LATICES FOR WOOD COATING

BACKGROUND OF THE INVENTION

This invention relates to thermosetting emulsion latex mixture and particularly to acrylamide modified acrylic latices prepared from non-hydroxy-bearing vinyl unsaturated hydrocarbons and to clear and pigmented coatings prepared therefrom.

Thermoset clear and pigmented coatings and copolymer coatings bearing hydroxyl, carboxyl or amide functionality and capable of curing by aminoplast i.e. melamine-formaldehyde or glycoluril, cross-linking agents are known to the coatings art. Glycoluril compositions are known for use in solvent based coating compositions such as disclosed in U.S. Pat. No. 4,064,191 and for use in powder coatings such as disclosed in U.S. Pat. No. 4,118,437 and U.S. Pat. No. 4,255,558.

U.S. Pat. No. 4,442,257 (Borovicka et al) teaches low temperature thermosetting emulsion latex mixtures and to polymers containing both ethylene urea and hydroxyl (or hydroxyl plus carboxyl) functionality and which form a thermoset cross-linked polymer under moderate heating. U.S. Pat. No. 4,444,941 teaches low temperature cure coatings derived from acrylamide emulsion polymer containing both carboxyl and hydroxyl groups and which can cross-link with a glycoluril curing agent.

U.S. Pat. No. 4,255,558 (Turpin) teaches a self-curing powder paint composition comprising a thermoset glycoluril copolymer containing methylol or alkoxy methyl glycoluril groups adapted to cross-link with reactive hydroxyl, carboxyl or amide groups on the said copolymer.

It has now been found that an aqueous latex coating composition based on a thermosetting combination of glycoluril cross-linkers and certain reactive polymers, preferably an acrylamide polymer, but devoid of any hydroxyl units provides a low temperature cure surface coating.

SUMMARY OF THE INVENTION

Briefly, an acrylamide aqueous latex coating composition containing a glycoluril type cross-linking agent, one or more non-hydroxyl bearing acrylic monomers, a vinyl unsaturated hydrocarbon, acrylamide and a carboxyl containing monomer provide a reactive emulsion polymer adapted to be cross-linked with an aminoplast or glycoluril upon moderate heat curing to form a cured coating composition. The acrylamide monomer, the carboxyl monomer, and the acrylic monomer are copolymerized together with other ethylenically unsaturated monomers in an aqueous emulsion polymerization process to produce a reactive emulsion polymer. A glycoluril or melamine is added to the emulsion to provide a thermosetting emulsion mixture, devoid of hydroxyl functionality and adapted to cure and cross-link upon application of moderate heat. Such coatings and process are particularly useful for coating hardboard.

DETAILED DESCRIPTION OF THE INVENTION

The thermosetting composition of this invention comprises an acrylamide emulsion polymer having no reactive hydroxyl groups and a major proportion of vinyl unsaturated hydrocarbons. Such emulsion polymers cure with an added glycoluril through available amide or carboxyl functionality.

Referring first to the emulsion polymer, the acrylamide polymer comprises copolymerized ethylenically unsaturated monomers including at least 10% copolymerized monomers of acrylamide and carboxyl monomer. Preferably the polymer contains polymerized monomer by weight between 1% and 20% acrylamide, between 0.5 and 10% carboxyl monomer and a major proportion, up to 60% of a vinyl unsaturated hydrocarbon, with the balance being other non-hydroxyl containing ethylenic monomers. The acrylamide monomers can be acrylamide, methacrylamide, ethacrylamide, acrylonitrile, methacrylonitrile, and similar atoms alkyl acrylamide and methacrylamide monomers. Carboxyl containing monomers are ethylenically unsaturated monomers containing carboxyl groups such as acrylic, methacrylic, or ethacrylic acid, as well as itaconic, citraconic, fumaric, maleic, mesaconic and aconitic acids. The preferred acids are acrylic and methacrylic acids. Hydroxyl containing monomers are specifically excluded from the present invention and in this fashion the present compositions and process differ significantly from the compositions taught in U.S. Pat. No. 4,444,941. In addition to the acrylamide monomer and the carboxyl functional monomer, vinyl unsaturated monomers are quite important. Such ethylenically unsaturated monomers can include, for example, styrene, methyl styrenes and similar alkyl styrenes, chlorostyrene, vinyl toulene, vinyl naphtalene, divinyl benzene, butadiene and the like. Styrene is most preferred because it contributes to desirable film properties. Other non-hydroxyl containing monomers make up the balance of the monomers used in the preparation of the aqueous emulsion polymer. These include typical alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and ethacrylate, and various reaction products such as butyl, phenyl, and cresyl glycidyl ethers reacted with acrylic and methacrylic acids. The ethylenically unsaturated monomers can be co-polymerized by free radical induced addition polymerization using peroxy or azo catalysts, common redox catalysts, ultraviolet radiation, or the like.

The non-hydroxyl containing acrylamide polymers contain carboxyl functionality for cross-linking by reaction with glycoluril type cross-linkers. Glycoluril derivatives are disclosed in U.S. Pat. No. 4,064,191 and are also known as acetylene diureas. Glycolurils are derived by reacting two moles of urea with one mole of glyoxal as illustrated in U.S. Pat. Nos. 4,444,941 and 4,442,257.

The ethylenic monomers can be polymerized in an aqueous medium at a pH below 2 although preferably between about 1.0 and 6. Generally, the polymerization is conducted at a temperature of about 20°–100° C. in the presence of a free radical generating catalyst. Commonly used free radical initiators include various perox-
:::

ygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the latices of this invention, they are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethlamine lauryl sulfate; alkali metal and ammonium salts of sulfonated petroleum or paraffin oils; sodium salts of aromatic sulfonic acides, such as dodecane-1-sulfonic acid and octadiene-1-sulfonic acid; aralkylsulfonates such as sodium ispropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used may be from about 0.01 to 6% or more by weight of the monomers. All the emulsifier may be added at the beginning of the polymerization or it may be added incrementally or by proportioning throughout the run.

Typical polymerizations for the preparation of the self-emulsion latices of this invention are conducted by charging the monomers into the polymerization reactor which contains water and a portion of the emulsifying agent. The reactor and its contents are heated and the initiator added.

The preferred emulsion latex matrix polymer can contain by weight between 1% and 22% acrylamide or methacrylamide, and between 0.5 to 10% carboxylic acid monomer and from 5% to 60% vinyl unsaturated hydrocarbon, with the balance to 100% made up of other non-hydroxyl containing ethylenically unsaturated monomer. The thermosetting composition of this invention can contain between 5% and 55% weight glycoluril with the remaining being reactive matrix polymer. The preferred compositions contain between 15 and 35 weight parts glycoluril cross-linking agent per 100 weight parts reactive matrix polymer.

The thermosetting compositions cure quickly at low temperatures under either basic or acidic curing conditions although a faster cure results under acidic conditions. Acid catalyst such a p-toulene sulfonic acid is useful for accelerating the cure. The thermosetting composition can be used as a clear coating or as a pigmented coating. These coatings are particularly useful in coating wood, hardboard, and plastic substrates.

The following illustrative Examples should not be narrowly construed. Unless otherwise indicated parts and percentages are by weight and temperature is given in degrees Centigrade.

EXAMPLE 1

A non-hydroxyl bearing acrylic latex was prepared from the following ingredients:

| Group | Ingredients | |
|---|---|---|
| A | Demineralized Water | 82.79 |
|  | Monawet MM-80 | 0.26 |
| B | Styrene | 1.17 |
|  | Ethyl Acrylate | 0.83 |
| C | Ammonium Persulfate | 0.25 |
|  | Demineralized Water | 0.40 |
| D | Acrylamide (50% Aqueous) | 15.8 |
| E | Ammonium Persulfate | 0.25 |
|  | Demineralized Water | 6.50 |
| F | Styrene | 51.64 |
|  | Ethyl Acrylate | 32.36 |
|  | Methacrylic Acid | 4.0 |
|  | Monawet MT-70 | 0.319 |
| G | Demineralized Water | 0.50 |
| H | Sodium Formaldehyde-Sulfoxylate | 0.009 |
|  | Demineralized Water | 0.10 |
| I | t-Butyl Hydroperoxide | 0.012 |
|  | Demineralized Water | 0.15 |
| J | Sodium Formaldehyde-Sulfoxylate | 0.009 |
|  | Demineralized Water | 0.10 |
| K | Nuosept 95 | 0.042 |

Trademarks:
Monawet MM-80 and MT-70 Surfactants (Mona Industries); NUOSEPT 95 preservative (Tenneco Chemicals).

The emulsion polymer is prepared in a conventional reactor as follows:

To components "A" heated under an inert sparge at 82° C. was added components "B" and the sparge discontinued. After five minutes "C" was added. After ten minutes, monomer feeds "D" and "F" were started and added over a 3½ hour feed time while the initiator feed "E" was added over a 3¾ hour period. The pump from "D" was rinsed with "G" after feed was completed. The reaction was maintained for 1½ hours at 81°–83° C. whereupon "H", "I", and "J" were added into the hold at 30, 40 and 50 minutes. After adding "K" to the cooled product the latex was filtered and stored. The emulsion polymer latex is particularly suitable as a binder system for a paint composition.

Paint composition. The foregoing latex can be utilized to produce a useful paint composition which can be applied to a substrate and cured at low temperatures such as 10 minutes at 120° F., or an oven bake and/or infrared heat to achieve a substrate surface temperature of from about 100° F. to about 260° F. A typical paint composition is as follows:

| Paint Composition | Pounds |
|---|---|
| Water | 100 |
| Defoamer | 2.6 |
| Phosphate Surfactant | 5.9 |
| Nonionic Surfactant | 3.1 |
| Ethylene Glycol | 9.3 |
| TiO$_2$ | 99.7 |
| Barytes | 47.0 |
| Amorphous Silica | 397.7 |

| Paint Composition | Pounds |
| --- | --- |
| Shading Bases | 3.0 |
| Latex (45% NV) | 460 |
| Glycoluril (45% water) | 107 |
| Polyphase | 4.4 |
| Foamaster O | 4.2 |
| Isopropanol | 35.5 |
| Butyl Cellosolve | 40.4 |
| L-7500 Defoamer | 0.67 |
| Butyl Cellosolve | 0.67 |

Trademarks:
Polyphase Anti-Mildew Agent AF-1 (Troy Chemical Company); FOAMASTER O Defoamer (Diamond Shamrock Corporation); L-7500 Silicone surfactant (Union Carbide Corporation); Cellosolve (Union Carbide Corporation).

This paint was catalyzed with 1.7 percent (40% active) paratoulene sulfonic acid applied to a hardboard and baked in at 350° F. for 1 minute, a cross-linked coating having good physical properties was obtained.

EXAMPLE 2

The latex of Example 1 was combined with 107 grams dihydroxy ethylene urea (45% water) and held at 45°–80° C. for 1 hour. The latex product containing curing agent was cooled and stored. Products prepared in this manner display better cure at lower temperatures and exhibit improved enamel holdout over porous substrate.

EXAMPLE 3

The process of Example 2 was repeated with the exception that D.D.E.U. (dimethyloldihydroxyethylene urea) was used in place of dihydroxy ethylene urea.

EXAMPLE 4

The latex of Example 1 was cold-blended with Cymel 1172 (80% active tetramethylol glycoluril cross-linker from American Cyanamid Company) in the ratio of 439.65 parts latex to 431.1 parts Cymel 1172. An acid catalyst, p-toulene sulfonic acid (40% active), was added and the mixture drawn down on a glass plate and also on a Lenetta chart. After baking these drawdowns for one minute at 300° F. gloss measurements and rub tests (MEK double rubs) were performed. Results are shown as (4A) in Table I and compared with identical compositions where the styrene component was increased to 53.64 parts (4B) and 55.64 parts (4C).

TABLE I

| | Gloss And MEK Rub Tests | | | | | |
| --- | --- | --- | --- | --- | --- | --- |
| | 4A | | 4B | | 4C | |
| | MEK Rubs | Gloss* | MEK Rubs | Gloss | MEK Rubs | Gloss |
| Glass Plate | 20 | — | 20 | — | 20 | — |
| Lenetta Chart | — | 60 | — | 60 | — | 60 |

*60° Gloss reading.

What is claimed is:

1. In a process for producing a thermosetting low temperature curable composition containing a polymeric composition dispersed in water, the process steps comprising:

providing an aqueous mixture containing by weight between 5% and 60% of a glycoluril cross-linking agent cold blended with between 40% and 95% of an emulsion polymer; wherein said percentages total 100 percent and are based on the combined weights of cross-linking agent and latex polymer exclusive of water; wherein said emulsion polymer comprises polymerized ethylenically unsaturated monomers selected from between 0.5% and 10% alpha,beta-ethylenically unsaturated carboxylic acid monomer, between 1% and 20% acrylamide or methacrylamide monomer, between 20% and 60% vinyl unsaturated hydrocarbon monomer, and the balance other ethylenically unsaturated monomer, wherein said emulsion polymer contains only reactive carboxyl or reactive amide groups for cross-linking with said glycoluril cross-linking agent.

2. The process of claim 1 wherein the cross-linking agent is tetramethylol glycoluril, the carboxylic acid monomer is methacrylic acid, and the hydrocarbon monomer is styrene.

3. A hardboard coated with the composition prepared according to the process of claim 1.

* * * * *